United States Patent
Hall et al.

[11] Patent Number: 5,917,597
[45] Date of Patent: Jun. 29, 1999

[54] NOISE SUPPRESSION APPARATUS AND METHOD FOR TIME DIVISION MULTIPLEXED FIBER OPTIC SENSOR ARRAYS

[75] Inventors: David B. Hall, La Crescenta; James S. Bunn, Jr., Malibu, both of Calif.

[73] Assignee: Litton Systems, Inc., Woodland Hills, Calif.

[21] Appl. No.: 09/018,774

[22] Filed: Feb. 4, 1998

[51] Int. Cl.⁶ ....................................................... G01B 9/02
[52] U.S. Cl. .............................. 356/345; 356/352; 385/12
[58] Field of Search ..................................... 356/345, 352; 385/12

Primary Examiner—Robert H. Kim
Assistant Examiner—Andrew H. Lee
Attorney, Agent, or Firm—Lynn & Lynn

[57] ABSTRACT

Leakage optical signals injected into a time division multiplexed sensor system are modulated during off periods in the duty cycle in the sensor interrogation signal. The leakage light is modulated such that its unwanted contributions to the sensor output signals are displaced in frequency from the base band frequency. This frequency displacement greatly reduces unwanted noise power in the received signals.

14 Claims, 4 Drawing Sheets

NOISE SUPPRESSION APPARATUS AND METHOD FOR TIME DIVISION MULTIPLEXED FIBER OPTIC SENSOR ARRAYS

BACKGROUND OF THE INVENTION

This invention relates generally to fiber optic sensor systems and particularly to techniques for processing signals output from fiber optic interferometric sensors to measure changes in a physical parameter.

A time division multiplexed array sends a pulse of light from a laser source down a fiber optic transmission line toward a series of separate fiber optic interferometer sensors. With suitable delays in the fiber optic network, the single input light pulse is divided up among the interferometer sensing elements. Each element has an output light pulse with the appropriate acoustic information encoded on it. The output light pulses are coupled sequentially with no overlap onto a return fiber optic transmission line that travels to the photodiode receiver and associated signal processing electronics. Thus, one input light pulse is converted into a train of output light pulses equal to the number of sensors.

The time duration of the output pulse train governs the repetition rate of the input pulse. After one output pulse train is received, it is closely followed by another pulse train derived from a second input pulse. The duty cycle of the input pulse train is low. It can only approach one over the number of sensors interrogated without overlapping of adjacent output pulses.

There are two methods of input light pulse generation, internal and external. The internal method is the on and off switching of the laser source, and the external method is the on and off gating of a constant output laser source with an external optical switch. In either case, ideal switching implies that the off state is truly off with an infinite on-off extinction ratio allowing for no unwanted background leakage light.

For a non-ideal switch, leakage light traveling through the fiber optic acoustic array is superimposed on each output light pulse as it is electronically gated and detected. In a fiber optic system with a large number of sensors, the noise produced by even a very small amount of background leakage light can be many times the noise produced by the same output light pulse with no light leakage. In particular, intensity fluctuations of the leakage light from numerous parasitic interferometer returns are produced by laser phase noise. For N sensors the number of parasitic interferometer returns is equal to $N*(2N-1)$. Each of these returns has a noise power associated with it. This component of optical noise, which is primarily 1/f in character with most of its frequency content below 100 KHz, can severely degrade system performance even with a 50 dB optical switch.

The parasitic interferometer returns for N sensors correspond to a variety of pathways. Length mismatches are as short as the length mismatch for each of the sensors and as long as the difference between the longest round-trip path through the most distant sensor and the shortest round-trip path through the closest sensor. The length mismatch for each sensor which will be called the primary length mismatch is typically one meter whereas the longest mismatch might be one kilometer or more. The second shortest mismatch corresponding to round trip distances between adjacent sensors is typically twenty meters or more.

SUMMARY OF THE INVENTION

The present invention suppresses noise due to leakage light in a time division multiplexed sensor system that includes a plurality of interferometric sensors arranged in a sensor array to receive pulsed optical signals from an optical signal source that operates in a duty cycle. Signals output from the optical source are modulated during off periods in the duty cycle, which modulates the leakage light but not the sensor interrogation signals. The leakage light is modulated in such a way that its unwanted contributions to the output signals are displaced in frequency from the baseband frequency. This frequency displacement greatly reduces unwanted noise power in the received signals.

DESCRIPTION OF THE PREFERRED EMBODIMENT

This disclosure describes an apparatus and a method for suppressing noise in a time division multiplexed sensor array. Specific details are disclosed to provide a thorough description of the invention. However, it will be apparent that the present invention may be practiced without these specific details. Well-known components are shown in block diagram form, rather than in detail, to avoid unnecessarily obscuring the invention.

Figure 1:
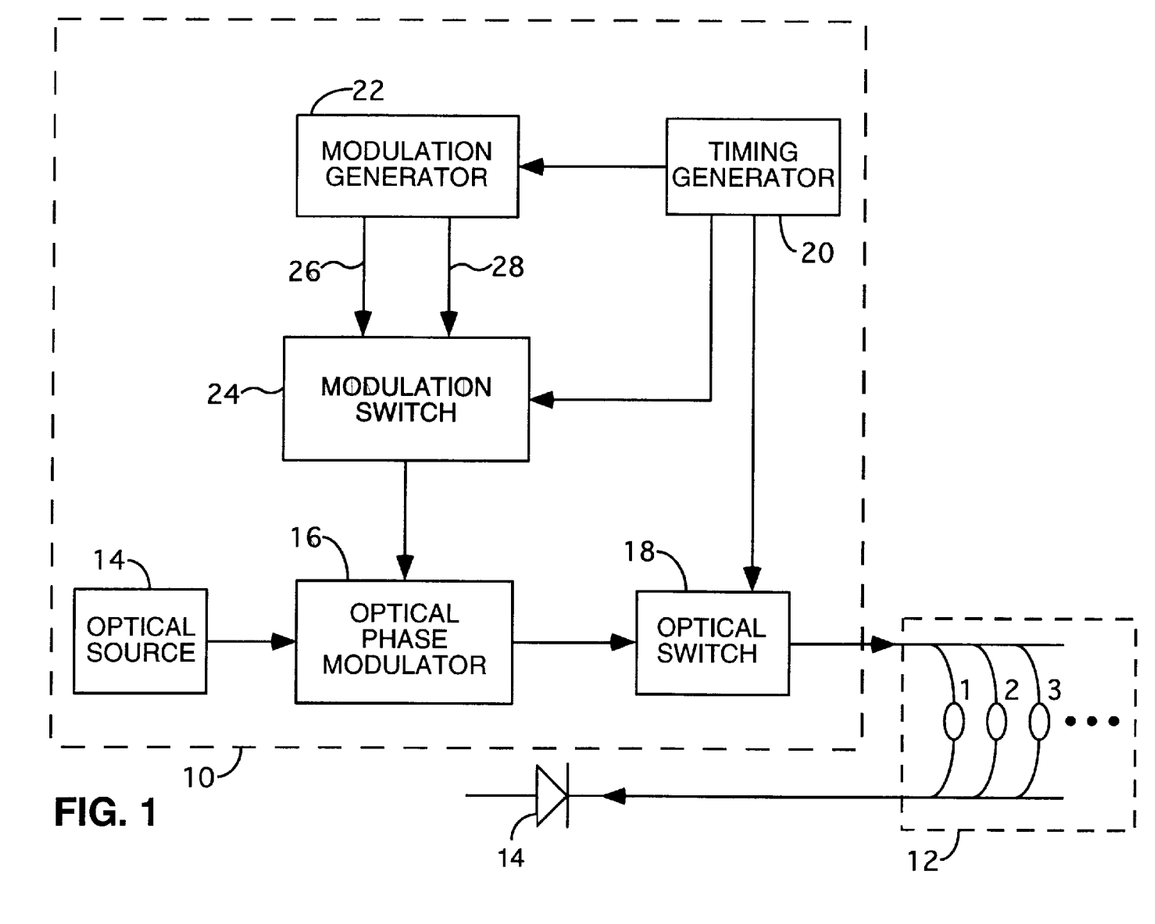
FIG. 1 is a block diagram of a time division multiplexed fiber optic sensor array that includes a noise suppression system according to the present invention.

FIG. 1 illustrates a noise suppression system 10 arranged to provide optical signals to a fiber optic sensor array 12 arranged to provide an output to a polarization diversity detector 14. The fiber optic sensor array 12 preferably includes a plurality of fiber optic interferometric sensors 12A, 12B, etc. arranged in a ladder array. Mismatched fiber optic interferometers are used as the sensing elements for fiber optic acoustic arrays. The fiber optic interferometric sensors 12A, 12B, etc. preferably are either Mach-Zehnder or Michelson interferometers, the structures of which are well-known in the art.

The noise suppression system 10 includes an optical signal source 15 that provides a coherent optical signal to an optical phase modulator 16. Phase modulated optical signals are output from the optical phase modulator 16 to an optical switch 18. The optical switch 18 operates under the control of a timing generator 20 to provide the optical signals to the fiber optic sensor 12. The timing generator 20 provides clock and sync signals to a modulation generator 22. A modulation switch 24 is connected between the modulation generator 22 and the optical phase modulator.

Figure 2:
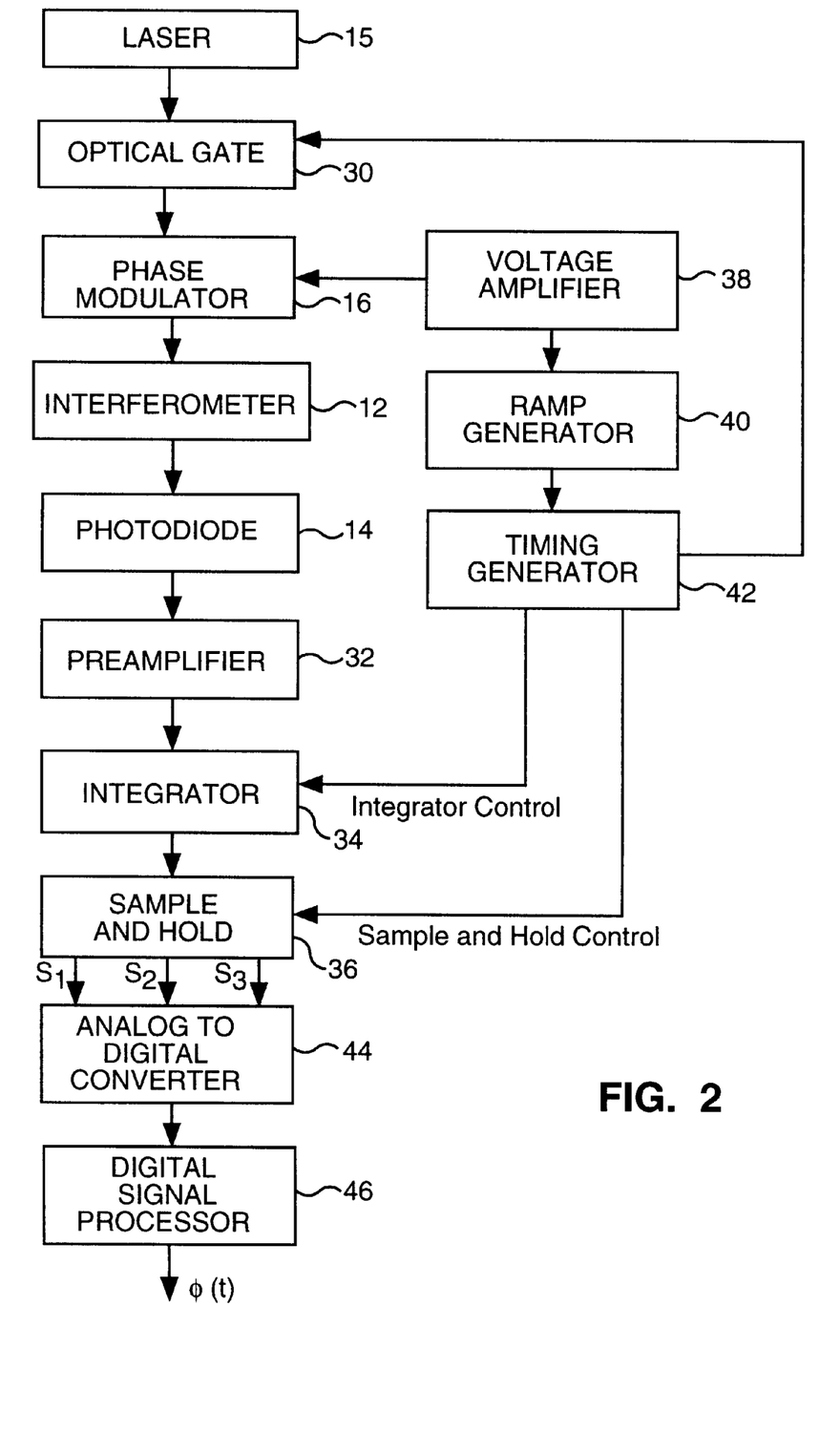
FIG. 2 is a block diagram illustrating a three level modulation technique that may be used with the fiber optic sensor array of FIG. 1.

FIG. 2 illustrates a modulation system that may be used in the present invention. The photodetector 14 provides an electrical signal indicative of the optical output of the interferometer array to a preamplifier 32. The preamplifier amplifies the photodetector output and provides the amplified photodetector output to an integrator 34. A sample and hold circuit 36 receives the output of the integrator 34.

A voltage amplifier provides voltage to the phase modulator 16 and to a ramp generator 40. The ramp signal output from the ramp generator 40 is input to a timing generator 42. The tinning generator 42 then provides a timing signal to an optical gate 30 that is placed between the laser 15 and the phase modulator 16. The timing generator 42 also provides an integrator control signal to the integrator 34 and a sample and hold control signal to the sample and hold circuit 36.

The output of the sample and hold circuit 36 is then input to an analog-to-digital converter 44 that digitizes the integrated interferometer output signals. The digitized signals $S_1$, $S_2$ and $S_3$ are then input to a digital signal processor 46.

Each fiber optic interferometer measures a time varying phase delay between two paths that produces a measured signal at the output of the interferometer. The phase delay may be written as $$S(\Phi) = A + B \cos \Phi. \tag{1}$$

There are three terms in Eq. (1) that must be considered: an average signal A, an interference signal amplitude B, and the desired interferometer phase shift $\Phi$. All three terms are time varying.

According to prior practice, extraction of the phase shift is possible by means of a phase generated carrier. Light from the laser source has impressed on it a sinusoidally varying phase at some carrier frequency produced by either internal frequency modulation of the laser source or by phase modulation with an external phase modulator. Detection of the interferometer output is performed at various harmonics of the carrier frequency. Mixing of the interferometer signal with appropriate reference signals at harmonics of the carrier frequency and subsequent filtering produces two outputs at baseband. These two outputs may be written as:

$$Q(\Phi) = Q_0 \sin \Phi \tag{2}$$

and $$I(\Phi) = I_0 \cos \Phi. \tag{3}$$

These outputs $Q(\Phi)$ and $I(\Phi)$ are the quadrature and in phase terms of the interferometric phase shift $\Phi$. An arc tangent operation on the ratio Q/I produces the desired phase shift.

Generation of a discrete interferometer shift is central to the demodulation method described below. Acquisition of the interferometer phase $\Phi$ is reduced to simple arithmetic operations. In particular, mixing of the interferometer output with harmonic reference signals and subsequent filtering all needed for the phase generated carrier are eliminated. In general, digital signal processing is preferred over analog signal processing for the advantages it offers in noise, bandwidth and dynamic range performance. The intensity signal produced by the varying interferometer phase $\Phi$ is sampled and transmitted to the rest of the demodulation electronics processing.

The interferometer phase shift $\Phi$ is a function of the optical frequency of the laser source. The phase shift may be written as $$\Phi = 2 \pi f_0 \tau. \tag{4}$$

The optical frequency is $f_0$, and the time delay is $\tau$ due to the interferometer path mismatch.

There are two ways to change the optical frequency of the light propagating through the interferometer from one discrete level to another discrete level. The first method is a step change of laser source frequency by a step change of laser cavity length or by laser mode hopping. The second is a step change of optical frequency at the output of an external phase modulator by generating a linear phase ramp over time on the modulator.

The optical phase shift within the phase modulator produced by the linear voltage ramp is $$\Theta(t) = K[V(t) + V_0] = 2\pi\beta t + \Theta_0 \quad 0 < t < t_0. \tag{5}$$

The proportionality constant K relating optical phase shift to applied voltage has a typical value of about one radian per volt for lithium niobate waveguide phase modulators. The time derivative of phase shift $\Theta/2\pi$ is the frequency shift $\beta$ impressed on the light by the phase modulator. The static phase offset is $\Theta_0$. The light entering the phase modulator has an optical frequency $f_0$, and the light exiting has an optical frequency $f_0 + \beta$. The duration of the linear voltage ramp is $t_0$.

The interferometer phase shift $\Phi$ is changed by the phase modulator's linear voltage ramp, which induces a phase shift $\alpha$. The phase shift then becomes $$\Phi + \alpha = 2 \pi (f_0 + \beta) \tau. \tag{6}$$

The phase shift $\alpha$ can also be produced by a step change in the laser source frequency.

Three different interferometer phase shifts are generated sequentially. The measured signals corresponding to the phase shifts are:

$$S_1(\Phi - \alpha) = A + B \cos (\Phi - \alpha), \tag{7}$$

$$S_2(\Phi) = A + B \cos (\Phi) \tag{8}$$

and $$S_3(\Phi + \alpha) = A + B \cos (\Phi + \alpha). \tag{9}$$

The signals $S_1$ and $S_3$ are produced by equal and opposite linear phase ramps on an external phase modulator and signal $S_2$ is produced with the phase modulator in a quiescent state. Alternatively, the signals $S_1$ and $S_3$ are produced by equal and opposite step changes in the laser source frequency, and signal $S_2$ is produced without any step change in frequency.

Appropriate sums and differences of the three sequential signals are used to produce the quadrature and in phase terms of the interferometric phase shift $\Phi$. They may be expressed as $$Q(\Phi, \alpha) = S_1 - S_3 = 2B \sin \alpha \sin \Phi = Q_0 \sin \Phi \tag{10}$$

$$I(\Phi, \alpha) = 2S_2 - S_1 - S_3 = 2B(1 - \cos \alpha) \cos \Phi = I_0 \cos \Phi \tag{11}$$

The ratio of the quadrature to in-phase terms is $$\frac{Q}{I} = ctn\left(\frac{\alpha}{2}\right)\tan\phi. \tag{12}$$

A phase shift α of 90 degrees yields $$\frac{Q}{I} = \tan\phi \tag{13}$$

and $$\phi = \tan^{-1}\left(\frac{Q}{I}\right). \tag{14}$$

The phase shift α does not have to be 90 degrees for successful implementation of the three level algorithm. Referring to Equations (9) and (10), the peak to peak amplitudes of $2Q_0$ and $2I_0$ can be determined by observing Q and I for a time sufficient for interferometer phase Φ to go through a number of cycles. Although the peak to peak amplitude which is proportional to B for both Q and I changes quite rapidly, the ratio of $Q_0$ over $O_0$ changes very slowly over time. Solving for the phase angle Φ yields:

$$\frac{Q_0}{I_0} = ctn\left(\frac{\alpha}{2}\right). \tag{15}$$

$$\frac{Q}{I} = \left(\frac{Q_0}{I_0}\right)\tan\phi \tag{16}$$

$$\phi = \tan^{-1}\left[\frac{\frac{Q}{Q_0}}{\frac{I}{I_0}}\right]. \tag{17}$$

The performance of the algorithm depends on how equal the magnitudes are for the opposite phase shifts of signals $S_1$ and $S_3$. If the phase shifts for $S_1$ and $S_3$ drift over time yet track one another in magnitude, the performance should not be degraded.

In the prior art, the interferometer phase shift is sinusoidally modulated at a carrier frequency of at least twice the measured frequency to be sensed, and the sampling must be fast enough to adequately sample at least the second harmonic of the carrier frequency. According to the sampling theorem, at least 10 samples, and preferably many more samples are required during a period of the highest acoustic frequency to be sensed.

The present invention requires three samples of the interferometer output to measure interferometer phase Φ. Therefore, a minimum of six interferometer samples are required over the period of the highest frequency to be sensed. In general, fewer samples of interferometer output are required to produce a sensor with a given measurement bandwidth. This allows wider "time slots" to carry the samples and allows more sensor signals to be time division multiplexed onto a fiber to achieve given sensor bandwidth or noise level.

Prior art dictates sampling of the interferometer output at evenly spaced times during the modulation period of the sinusoidal phase generated carrier. This requires that adjacent samples of a given interferometer's output be separated by discrete time slots. If several sensors' signals are multiplexed, then their samples are interleaved through a modulation period. Tolerances on the time of arrival of these samples must account for the variations in transit time between sensors at every sample.

The three required optical frequencies can be transmitted to the sensor in immediate succession, thus enabling three sample returns from the sensor in contiguous time slots. The time delay between these three samples depends only on the sensor construction and not on the transit times between sensors in the array. Hence the timing of the returned signals is less sensitive to the irregularities in the array construction. The sensor array is somewhat easier to assemble because of the looser tolerances on sensor spacing.

The modulation generator 22 provides noise suppression modulation to the modulation switch 24 via a first channel 26 and provides signal modulation to the modulation switch 24 via a second channel 28. The modulation switch 24 also receives modulation switch control signals from the timing generator 20. The modulation switch control signals actuate the modulation switch 24 to select either noise suppression modulation or signal modulation. The timing generator 20 also provides clock signals to a receiver for sensor signal recovery.

The noise suppression system 10 according to the present invention uses a baseband nulling technique to suppress noise in the system. The light pulse train input to the fiber optic sensor array 12 has a very low duty cycle. Ordinarily, the light pulse is on for a time equal to about one percent of the total time. During the off time of around 99 percent of the total time, leakage light is generated and injected into the array 12. Appropriate modulation of the leakage light during the off time greatly reduces the contribution of the leakage light to the received optical noise in a fiber optic array system. This is done by displacing most of the noise out of baseband to some modulation frequencies that yield very low noise signals when detected in the appropriate manner and to other higher modulation frequencies beyond the detection bandwidth of the photodiode and associated preamplifiers.

The leakage light can be treated as a DC quantity with a characteristic noise power spectral density that is a summation over all the parasitic interferometer returns. Modulation of the optical phase of the leakage light removes some of the noise power from baseband to harmonics of the carrier frequency. The noise contribution for a single interferometer return after modulation is $$NPSD_{TOTAL}(f) = \sum_n J_n^2(\beta)NPSD(f - nf_{pgc}) \tag{18}$$

where $f_{pgc}$ is the phase generated carrier frequency and $J_n(\beta)$ is the well-known Bessel function. Eq. (18) may be simplified by using the condition that $$\sum_n J_n^2(\beta) = 1. \tag{19}$$

Therefore, the ratio of the noise power in the baseband harmonics to the total noise power is $$NPPSD_{BASEBAND}/NPSD_{TOTAL} = J_0^2(\beta). \tag{20}$$

The squared Bessel function coefficients with argument β determine the relative amounts of noise power aliased to various harmonics of the carrier frequency. The carrier frequency is assumed to be much higher than the noise bandwidth. As a result, there is negligible overlapping of noise in the sideband centered about the carrier frequency with noise in the baseband. The objective of the phase generated carrier is to minimize the fractional amount of noise power at baseband given by $J_0^2(\beta)$.

The origin of the phase generated carrier argument β is the mismatch of the two optical paths in a fiber optic interferometer return. The output of the interferometer return with an average power term and an interference term is $$S = A + B \cos(\Gamma_2 - \Gamma_1) \qquad (21)$$

where $\Gamma_2 - \Gamma_1$ is the phase delay mismatch of the two optical paths.

The phase delay mismatch $\Gamma_1 - \Gamma_2$ of the two paths is $$\Gamma_2 - \Gamma_1 = \{\Phi_2 + \Theta\cos[2\pi f_{pgc}(t - \tfrac{\tau}{2})]\} - \{\Phi_1 + \Theta\cos[2\pi f_{pgc}(t + \tfrac{\tau}{2})]\} \qquad (22)$$

$$\Gamma_1 - \Gamma_2 = \Phi + \beta \sin(2\pi f_{pgc} t) \qquad (23)$$

$$\beta = 2\Theta \sin(\pi f_{pgc}\tau) \qquad (24)$$

The environmental phase shift is $\Phi$; the applied phase shift is $\Theta$; the phase generated carrier frequency is $f_{pgc}$; and the time delay between the two paths in the interferometer is $\tau$. The interference term is given by the cosine of the phase delay mismatch.

$$\cos(\Gamma_2 - \Gamma_1) = J_0(\beta)\sin\Phi\sin(2\pi f_{pgc} t) + 2 J_2(\beta)\cos\Phi\cos(4\pi f_{pgc} t) + \text{high order harmonics} \qquad (25)$$

The interference term contains sines and cosines of the environmental phase shift $\Phi$ and Bessel function coefficients with argument $\beta$. Referring to equations (20) and (24), the fractional amount of noise power at baseband is $$\text{NPSD}_{BASEBAND}/\text{NPSD}_{TOTAL} = J_0^2[2\Theta\sin(\pi f_{pgc}\tau)] \qquad (26)$$

The argument of the Bessel function is periodic. For time delays which are integral multiples of one over the carrier frequency, the argument is zero and none of the noise power is aliased into the sidebands. For other time delays the amount of noise suppression at baseband is driven by the size of the applied phase shift $\Theta$.

Figure 3:
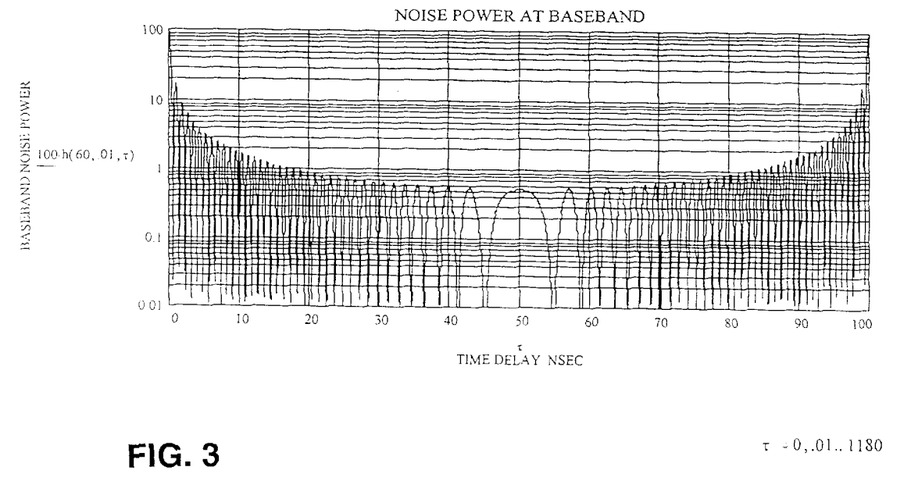
FIG. 3 graphically illustrates noise power in a time division multiplexed sensor system for a single phase generated carrier as a function of time for a period of 100 ns.

A plot of $J_0^2$ as a function of $\tau$ from 0 to 100 nanoseconds is shown in FIG. 3 for $\Theta$ of 60 radians and $f_{pgc}$ of 10 megahertz. At the end points of 0 and 100 nanoseconds, 100 percent of the noise power is in baseband; elsewhere most of the noise power in baseband has been suppressed. The average value of the rapidly oscillating function $J_0^2$ over all time delays is 1.38 percent, which indicates an average baseband noise suppression of 19 dB. Decreasing $\Theta$ reduces baseband noise suppression and increasing $\Theta$ enhances it.

Figure 4:
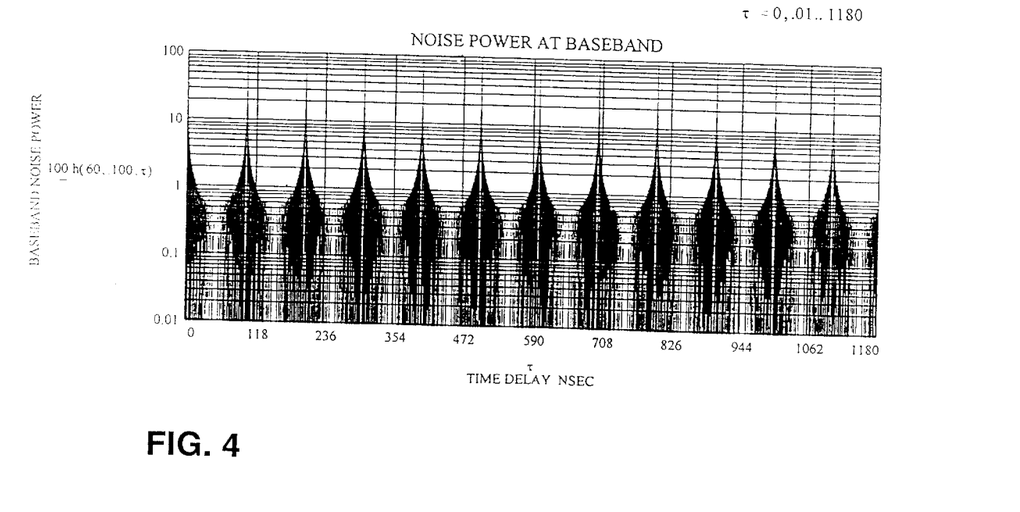
FIG. 4 graphically illustrates noise power in a time division multiplexed sensor system for a single phase generated carrier as a function of time for a period of 1180 ns.

Another plot is shown in FIG. 4 of $J_0^2$ for $\tau$ from 0 to 1180 nanoseconds. At multiples of 100 nanoseconds $J_0^2$ is 100 percent. Let 118 nanoseconds be a representative time delay between adjacent sensors in a ladder array corresponding to a round-trip distance of 24 meters. At all multiples of 118 nanoseconds shown in FIG. 4, $J_0^2$ is less than 3 percent, and in most cases it is well under 1 percent. Let the primary length mismatch for all sensors be centered at one meter, which gives an average time delay of 5 nanoseconds. The value of $J_0^2$ in the vicinity of 5 nanoseconds is anywhere from 0 to 3 percent. Both FIGS. 3 and 4 demonstrate that the average baseband noise suppression over all parasitic interferometer returns is about 20 dB.

An external lithium niobate phase modulator produces a typical phase shift of one radian per volt. Therefore, a zero to peak voltage of 60 volts, which corresponds to an applied phase shift of 60 radians, is required to obtain the results plotted in FIG. 3. Baseband noise suppression of 20 dB or more can be obtained with much smaller applied phase shifts. This is done by impressing two phase generated carriers at two separate frequencies on the leakage light. In this case, the fractional amount of noise power in baseband is $$\text{NPSD}_{BASEBAND}/\text{NPSD}_{TOTAL} = J_0^2[\beta_1]J_0^2[\beta_2] \qquad (27)$$

$$\beta_1 = 2\Theta_1 \sin(\pi f_{1pgc}\tau) \qquad (28)$$

$$\beta_2 = 2\Theta_2 \sin(\pi f_{2pgc}\tau) \qquad (29)$$

The noise power in baseband is a product of the two terms for phase generated carriers one and two. When the ratio of the two phase generated carrier frequencies is a ratio of small integers such as ¼ or ⅔, there are other contributions to the baseband noise power such as $J_4^2(\beta_1)J_1^2(\beta_2)$ and $J_2^3(\beta_1)J_2^2(\Theta_2)$. These contributions are typically less than 10 percent of the total.

Figure 5:
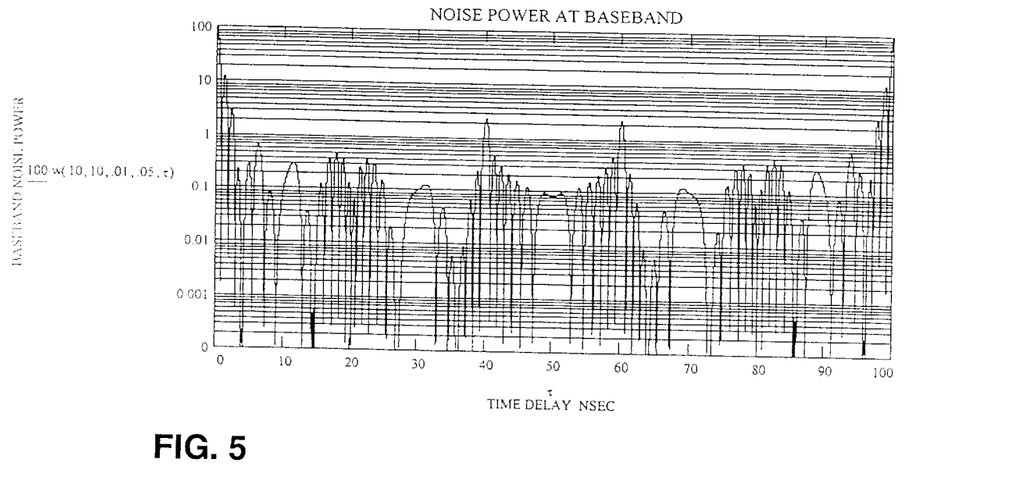
FIG. 5 graphically illustrates noise power in a time division multiplexed sensor system for a two phase generated carrier as a function of time for a period of 100 ns.

A plot of $J_0^2(\beta_1)J_0^2(\beta_2)$ as a function of $\tau$ from 0 to 100 nanoseconds is shown in FIG. 5 for $\Theta_1$ and $\Theta_2$ both set at 10 radians, for $f_{1pgc}$ set at 10 megahertz, and for $f_{2pgc}$ at 50 megahertz. At the end points of 0 and 100 nanoseconds 100 percent of the noise power is in baseband; elsewhere most of the noise power in baseband has been suppressed. The average power over all time delays is 0.98 percent indicating an average baseband noise suppression of 20 dB. Decreasing $\Theta_1$ or $\Theta_2$ or both reduces baseband noise suppression and increasing $\Theta_1$ or $\Theta_2$ or both enhances it.

Figure 6:
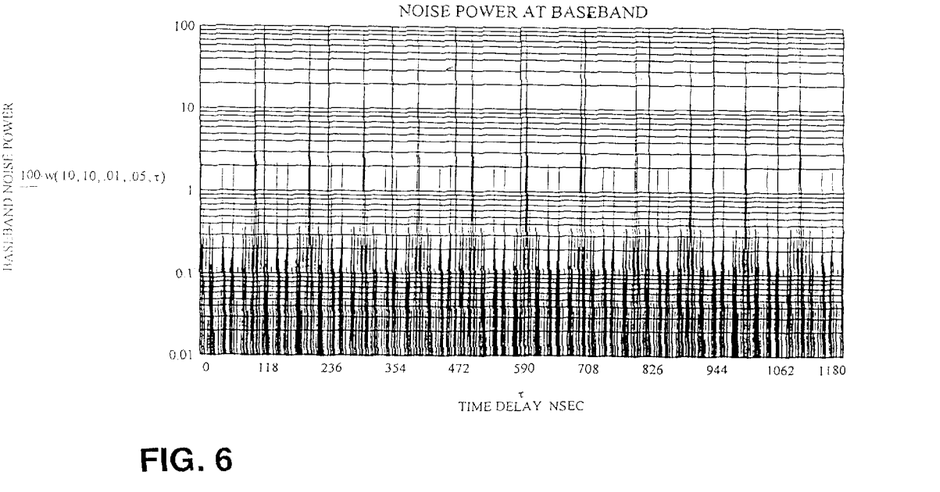
FIG. 6 graphically illustrates noise power in a time division multiplexed sensor system for a two phase generated carrier as a function of time for a period of 1180 ns.

Another plot is shown in FIG. 6 of $J_0^2(\beta_1)J_0^2(\beta_2)$ for $\tau$ from 0 to 1180 nanoseconds. As before, let 118 nanoseconds be a representative time delay between adjacent sensors in a ladder array. At all multiples of 118 nanoseconds shown on the plot, the fractional amount of baseband noise is of the order of one percent. The same is true for primary 5 nanosecond time delays from the individual sensors. Both plots in FIGS. 5 and 6 demonstrate an average baseband noise rejection over all parasitic interferometer returns of about 20 dB.

$\Theta_1$ and $\Theta_2$ of 10 radians correspond to a typical zero to peak voltage of 10 volts for an external lithium niobate phase modulator. If smaller voltages are desired for a 20 dB baseband noise suppression, a cascade of three or more phase generated carriers each with its characteristic frequency can be used. Tradeoffs must be made between lower voltages and added complexity of implementation.

From each interferometer an output light pulse with leakage light superimposed on it is electronically gated and detected. The gating time is controlled by the timing generator 18, which is high frequency master clock. During the gated on time, the light detected by the photodiode is integrated over a precise time interval which is equal to an integral number of clock cycles. The leakage light is modulated at a carrier frequency $f_{pgc}$ and appears on the gated output pulse as amplitude modulated components at the carrier frequency and its harmonics.

The carrier frequency is also keyed to the master clock in such a way that there is an integral number of cycles of the carrier frequency during the gated on time. An integration over an integral number of cycles of leakage light amplitude modulated at frequency $f_{pgc}$ yields a null output. The same null output is obtained for components of leakage light amplitude modulated at harmonics of the carrier frequency. In the case of two or more carrier frequencies, there must be an integral number of cycles of each carrier frequency during the gated on time. The integral number of cycles applies also to all difference frequencies formed by sum and difference combinations of harmonics of the individual carrier frequencies. In addition to the nulling process due to an integration over an integer number of cycles, there can be further reduction of detected leakage light due to filtering and high frequency roll-off in the detector pre-amplifier.

Let a gated on time of 100 nanoseconds equal one period associated with a 10 megahertz carrier frequency. This is also set to an integral number of cycles of a high frequency clock such as 5 for a 50 megahertz clock. The periods associated with the gated on time and the phase generated carrier do not have to be equal as they are in this example.

Jitter in the integration or gating time produces a small residual output that determines the efficiency of noise suppression for the first harmonic. The noise signal centered around the first harmonic is narrow band. Most of the frequency content of the baseband noise is below 100 KHz giving an equivalent noise bandwidth of the order of 100 KHz. With a carrier frequency of 10 MHz, the fractional bandwidth of the signal is one percent. All the same arguments apply to the second and higher order harmonics.

In a worst case scenario, the system may perform an integration for 101 nanoseconds over 101 percent of one cycle of a signal modulated at 10 megahertz. The first 100 nanoseconds produces a null output. The residual output is produced by the last one nanosecond of integration. When the amplitude is a maximum at t=100.5 nanoseconds, the residual output is maximized.

Efficient detection of the signal at 10 megahertz implies synchronous detection. Conceptually this is comparable to rectification in which the negative half cycles are inverted. Integration is then performed over the two positive 50 nanosecond half cycles. The ratio of the area represented by one nanosecond over the central portion of one 50 nanosecond half cycle and the area represented by two half cycles gives an estimate of the amount of noise suppression centered at 10 megahertz. The worst case scenario gives a value of 0.015 yielding a noise suppression of 18 dB for a one nanosecond error in the 100 nanosecond integration time.

Longer integration times and jitter amplitudes that are on average much less than one nanosecond will increase the efficiency of the noise suppression at the carrier frequency and its harmonics. For more than one phase generated carrier all the same arguments apply. Efficiency of noise suppression is of the order of 20 dB or better depending on the ratio of average jitter time amplitude to integration time. Overall, a 20 dB noise suppression figure for all noise in baseband and out of baseband seems reasonable.

The implementation of the noise suppression method is straight forward. During the off time, which is about 99 percent of the total time, one or more phase generated carriers modulate the leakage light. This can be done either by internal frequency modulation of a laser source or external phase modulation of a phase modulator.

The high frequency master clock 20 is used for timing the integration or gating period in detection of the output light pulses containing the encoded information from the acoustic sensors. The same clock is used in the appropriate timing of the one or more phase generated carriers.

The optical source 15 provides the optical power necessary to obtain signals from the interferometer sensors in the array 12. The light from the optical source 15 is modulated by the optical phase modulator according the source modulation scheme employed. The optical switch passes the modulated optical signal for short time periods to provide the array interrogation optical pulse.

The timing generator provides a low duty cycle (order of 1%) gate to turn on the optical switch. This enables the launch of a low duty cycle optical pulse for sensor array interrogation. The timing generator also provides other signals necessary for the interferometer signal recovery depending on the source signal modulation scheme employed. The timing generator provides all the necessary clock and synchronization signals to the modulation generator.

The timing generator 20 also synchronizes the phase modulator 16 with the optical switch 18 so that the appropriate signal modulation is present on the optical signal as it passes through optical switch 18. The control pulse for the phase modulator 16 precedes the control pulse for the optical switch 18 to compensate for the propagation delay from the optical phase modulator 16 to the optical switch 18.

The modulation generator 22 must produce two types of signals. According to the source modulation method used, the first signal is employed for the interrogation of optical pulses. The second signal is employed to implement the null suppression scheme. As previously noted, the noise suppression modulation signal contains an integral number of cycles of one or more frequencies in the sample period employed for signal recovery at the receiver. The signals are generated in any convenient fashion that produces stable sinusoids. For example, a direct digital synthesizer, operating from the clock, might generate one or more sinusoids synchronized to the clock and having an integer number of periods in the receiver sample period.

Exemplary embodiments of the invention are described herein to explain how to make and use the invention. In actual practice, modifications may be made within the scope and spirit of the invention. The described embodiments are to be considered in all respects as exemplary and illustrative rather than restrictive. Therefore, the appended claims rather than the foregoing descriptions define the scope of the invention. An modifications to the embodiments described herein that come within the meaning and ranges of equivalence of the claims are embraced within the scope of the invention.

What is claimed is:

1. Apparatus for suppressing noise due to leakage light in a time division multiplexed sensor system that includes a plurality of interferometric sensors arranged in a sensor array to receive pulsed optical signals over a range of baseband frequencies from an optical signal source that operates in a duty cycle, comprising:

a modulator arranged to modulate the optical signals output from the optical signal source during off periods in the duty cycle, the modulator being arranged to modulate leakage light at a phase generated carrier frequency $f_{pgc}$ such that signals returned from the sensor array resulting from leakage light being injected into the sensor array are displaced in frequency from the baseband frequencies such that contributions to signals output from the sensor array from the leakage light are reduced; and a clock arranged to time a gating period for detecting output light pulses from the sensor system and for timing a gating period having an on time time for application of the phase generated carrier frequency to the leakage light by the modulator and an off time.

2. The apparatus of claim 1 wherein the modulator comprises an internal frequency modulator in the optical signal source.

3. The apparatus of claim 1 wherein the modulator comprises a phase modulator external to the optical signal source.

4. The apparatus of claim 1 wherein the leakage light is expressed as a function having a periodic argument and wherein the modulation generator produces a noise suppression modulation signal that contains an integral number of cycles in the off time of the gating period for detecting output light pulses from the sensor system, so that the argument of the function is zero, which makes the leakage light have zero intensity.

5. The apparatus of claim 1, further comprising;

a modulation switch connected to the modulator;

a modulation generator arranged to provide signals to the modulator, the modulation generator and modulator being arranged to operate under control of the clock; and an optical switch connected between the modulator and the sensor array, the clock being arranged to synchronize the modulator with the optical switch to apply both interrogation optical pulses to the sensor array and to produce noise suppression signals.

6. The apparatus of claim 5 wherein the modulation generator produces a noise suppression modulation signal that contains an integral number of cycles in the off time of the gating period for detecting output light pulses from the sensor system.

7. The apparatus of claim 5 wherein the sensor system includes a photodetector that has a detection bandwidth and wherein a portion of the leakage light is modulated such that signals returned from the sensor array to the photodetector are outside the detection bandwidth.

8. The apparatus of claim 1 wherein the sensor system includes a photodetector that has a detection bandwidth and wherein portion of the leakage light is modulated such that signals returned from the sensor array to the photodetector are outside the detection bandwidth.

9. A method for suppressing noise due to leakage light in a time division multiplexed sensor system that includes a plurality of interferometric sensors arranged in a sensor array to receive pulsed optical signals from an optical signal source that operates in a duty cycle, comprising the steps of:

arranging a modulator to modulate the optical signals output from the optical signal source during off periods in the duty cycle, the modulator being arranged to modulate leakage light at a phase generated carrier frequency $f_{pgc}$ such that signals returned from the sensor array resulting from leakage light being injected into the sensor array are displaced in frequency such that contributions to signals output from the sensor array from the leakage light are reduced; and providing a clock arranged to time a gating period for detecting output light pulses from the sensor system and for tiring a period for application of the phase generated carrier frequency to the leakage light by the modulator.

10. The method of claim 9 including the step of arranging the modulation generator to produce a noise suppression modulation signal that contains an integral number of cycles in the off time of the gating period for detecting output light pulses from the sensor system.

11. The method of claim 9, further comprising the steps of;

connecting a modulation switch to the modulator;

providing a modulation generator arranged to provide signals to the modulator;

arranging the modulation generator and modulation switch to operate under control of the clock;

connecting an optical switch between the modulator and the sensor array; and arranging the clock to synchronize the modulator with the optical switch to apply both interrogation optical pulses to the sensor array and to produce noise suppression signals.

12. The method of claim 11 including the steps of:

expressing the leakage light intensity as a function having a periodic argument;

arranging the modulation generator to produce a noise suppression modulation signal that contains an integral number of cycles in the off time of the gating period for detecting output light pulses from the sensor system so that the argument of the function is zero, which makes the leakage light have zero intensity.

13. The method of claim 11 including the steps of:

arranging the sensor system to include a photodetector that has a detection bandwidth; and modulating the leakage light such that a portion of the signals returned from the sensor array to the photodetector are outside the detection bandwidth.

14. The method of claim 9 including the steps of:

arranging the sensor system to include a photodetector that has a detection bandwidth; and modulating a portion of the leakage light such that a portion of the signals returned from the sensor array to the photodetector are outside the detection bandwidth.

* * * * *